(12) United States Patent
Croak et al.

(10) Patent No.: US 7,995,486 B2
(45) Date of Patent: *Aug. 9, 2011

(54) METHOD AND APPARATUS FOR GRAPHICALLY DISPLAYING CALL SIGNALING FLOWS IN A NETWORK

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 115 days.

This patent is subject to a terminal disclaimer.

(21) Appl. No.: 12/262,588

(22) Filed: Oct. 31, 2008

(65) Prior Publication Data

US 2009/0052335 A1 Feb. 26, 2009

Related U.S. Application Data

(63) Continuation of application No. 11/018,239, filed on Dec. 21, 2004, now Pat. No. 7,447,159.

(51) Int. Cl.
*H04M 3/22* (2006.01)
*H04L 12/26* (2006.01)

(52) U.S. Cl. ............... 370/242; 379/32.05; 709/224; 714/48

(58) Field of Classification Search .......... 370/241, 370/242, 244, 248–250, 252; 379/32.01, 379/32.02, 32.05, 112.01, 133, 134, 136; 709/223–225; 714/47, 48

See application file for complete search history.

(56) References Cited

U.S. PATENT DOCUMENTS

| | | |
|---|---|---|
| 6,456,845 B1 | 9/2002 | Drum et al. |
| 6,611,498 B1 | 8/2003 | Baker et al. |
| 6,826,718 B1 | 11/2004 | Wu |
| 6,879,671 B2 | 4/2005 | Schmid et al. |
| 7,003,080 B1 | 2/2006 | Doskow et al. |
| 7,283,619 B2 | 10/2007 | Ethier et al. |
| 7,436,936 B2 * | 10/2008 | Terpstra et al. ............ 379/27.01 |
| 7,447,159 B1 * | 11/2008 | Croak et al. ................. 370/242 |
| 7,519,074 B2 * | 4/2009 | Ward et al. ................... 370/410 |
| 7,693,974 B2 * | 4/2010 | Huang et al. ................. 709/223 |
| 2004/0160896 A1 | 8/2004 | Luna et al. |
| 2006/0045121 A1 | 3/2006 | Monk |

* cited by examiner

*Primary Examiner* — Pankaj Kumar
*Assistant Examiner* — Duc T Duong

(57) ABSTRACT

A method and system for graphically displaying call signaling flows for a communications network is described. In one example, a call flow alarm indicating an improper call signaling flow for a call is received. A respective projected call signaling flow associated with the call is then obtained. Lastly, the improper call signaling flow and the respective projected call signaling flow are graphically displayed.

20 Claims, 5 Drawing Sheets

METHOD AND APPARATUS FOR GRAPHICALLY DISPLAYING CALL SIGNALING FLOWS IN A NETWORK

CROSS REFERENCE TO RELATED APPLICATIONS

This application is a continuation of U.S. patent application Ser. No. 11/018,239, filed Dec. 21, 2004 now U.S. Pat. No. 7,447,159, (currently allowed) which is herein incorporated by reference.

The present invention relates generally to communication networks and, more particularly, to a method and apparatus for graphically displaying call signaling flows in communications network, e.g., a Voice over Internet Protocol (VoIP) network.

BACKGROUND OF THE INVENTION

VoIP network service infrastructures contain different network elements that need to communicate with each other in order for calls to be setup and media paths established. For example, a Call Control Element (CCE), needs to communicate to routing databases and Border Elements (BE), and occasionally to Application Servers (AS). Broadly defined, a CCE is a network element that performs call control functions to setup a call, an AS is a network element that comprises the data as well as applications that the CCE needs in order to setup a call, and a Border Element is a network element that represents the edge of a VoIP network and serves as a gateway between a customer's network, a VoIP network, and a Public Switched Telephone Network (PSTN). Occasionally, routing configurations errors happen and messages between these network elements get into a looping pattern that creates call setup failures. These looping patterns can create network based call storms.

During these occasions of service disruptions, the network operators and engineers often have to investigate Call Detail Records (CDRs) and performance monitoring tools that record complex call signaling flows. Using this information, network operators are able to eventually determine the locations of the call flow aberrations that triggered the service problems. However, this procedure can consume a considerable amount of time and is not a convenient method for locating service disruption areas.

Therefore, a need exists for a method and apparatus for graphically displaying call signaling flows in a packet-switched network, e.g., a Voice over Internet Protocol (VoIP) network.

SUMMARY OF THE INVENTION

In one embodiment, a method and system for graphically displaying call signaling flows for a communications network is described. In one example, a call flow alarm indicating an improper call signaling flow for a call is received. A respective projected call signaling flow associated with the call is then obtained. Lastly, the improper call signaling flow and the respective projected call signaling flow are graphically displayed. In an alternative embodiment, the differences between the improper and projected call signaling flows are visually highlighted.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
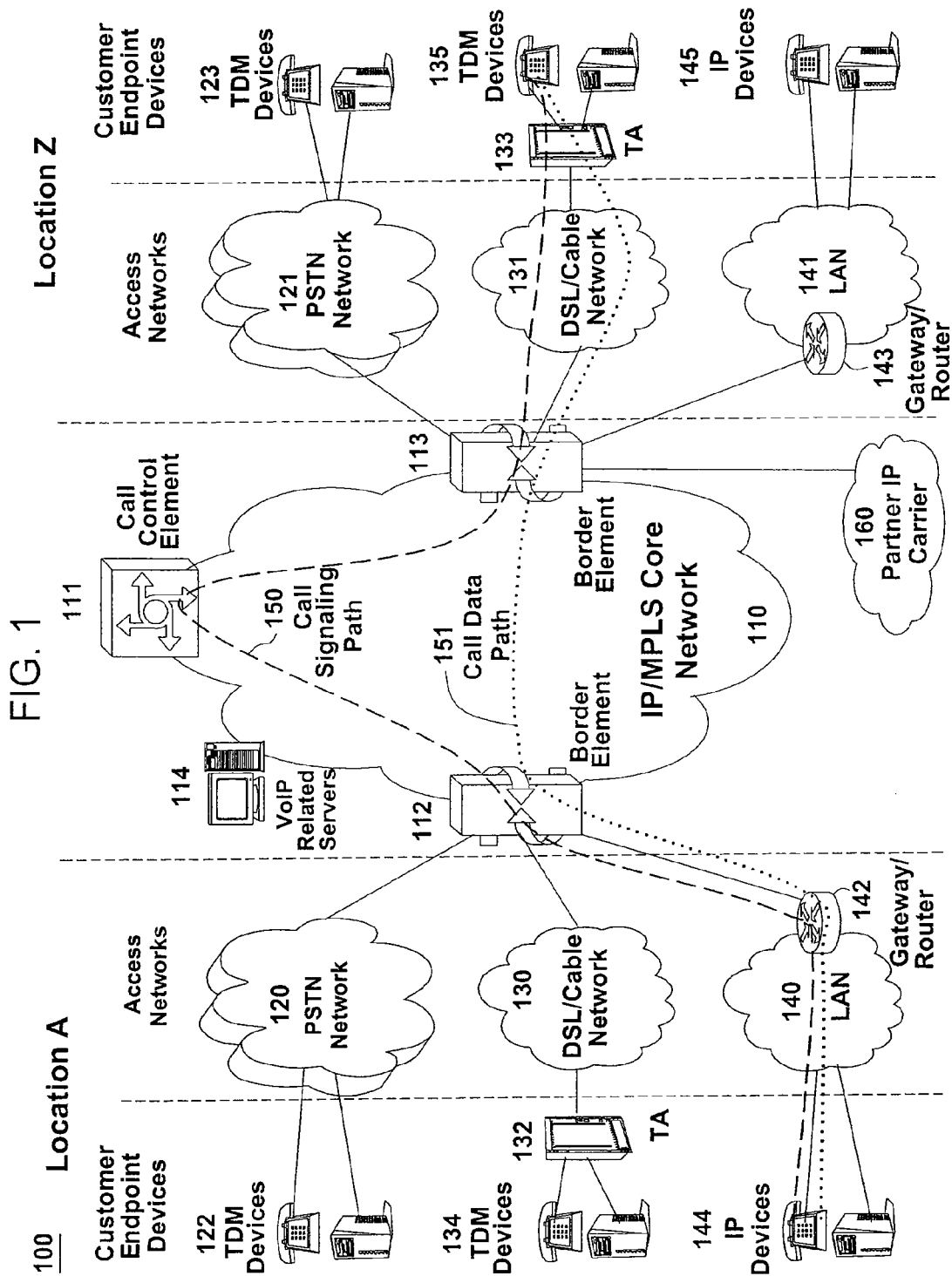
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

VoIP network service infrastructures contain different network elements that need to communicate with each other in order for calls to be set up and media paths established. For example, a Call Control Element (CCE), needs to communicate to routing databases and gateways, and occasionally to application servers. Occasionally, routing configurations errors happen and messages between these network elements get into a looping pattern that creates call setup failures. These looping patterns can create network base call storms.

To address this criticality, the present invention creates a routing verification function to ensure that call setup messages are following call signaling routing rules defined by the network operator and are not looping between network elements. The routing rules are derived from a suite of all permissible prescribed call signaling flows in the network. A prescribed call signaling flow is one that shows the message paths between network elements and their corresponding IP addresses used within in each path. If a looping pattern is detected, an alarm is generated, and diagnostics are produced that show where the looping pattern is occurring.

Figure 2:
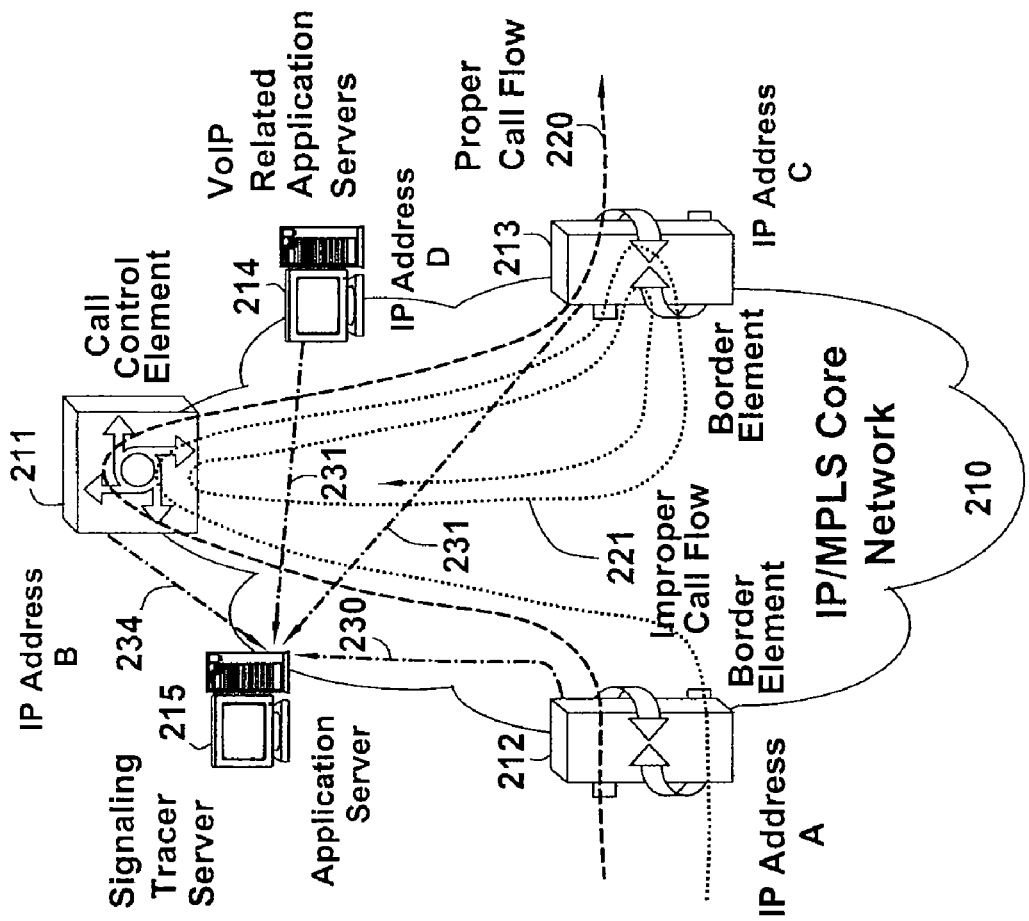
FIG. 2 illustrates an example of preventing improper call flows of the present invention.

FIG. 2 illustrates an example of preventing improper call flows in a VoIP network. A Signaling Tracer Server (STS) 215 collects call signaling flows from all packet-switched elements, e.g., VoIP network elements, within the network. Flow 230 shows the collection of call signaling flow from BE 212 to the STS; flow 231 shows the collection of call signaling flow from BE 213 to the STS; flow 232 shows the collection of call signaling flow from Application Server (AS) 214 to the STS; and flow 234 shows the collection of call signaling flow from CCE 211 to the STS. Using the collected signaling flows from the network, STS can recreate the actual call signaling flows that occur in the network. For instance, call signaling flow 220 is a proper call flow from BE 212 to CCE 211 to BE 213 having IP routing hops IP address A to IP address B to IP address C. Call signaling flow 221 is an improper call flow from BE 212 to CCE 211 to BE 213 to CCE 211 to BE 213 to CCE 211 with signaling messages looping between CCE 211 and BE 213. Actual call flow 221 has IP routing hops IP address A to IP address B to IP address C to IP address B to IP address C with routing loop between IP address B and IP address C.

In order to determine if an actual collected call signaling flow is a proper call flow, a suite of prescribed call signaling flows are created by the network operator to serve as a reference. For instance, a prescribed call flow of BE 212 to CCE 211 to BE 213 with IP routing hops of IP address A to IP address B to IP address C is created by the network operator. Then, a set of routing rules are derived from the suite of prescribed call signaling flow. For instance, a routing rule of call flow from a BE to a CCE to another BE all with different IP addresses is a proper routing rule based on the aforementioned prescribed call signaling flow example.

Once the routing rules are defined, the actual call flow can then be analyzed against these routing rules created by the network operator. For instance, when actual call flow 220 is analyzed against the routing rules, flow 220 matches the aforementioned routing rule created by the network operator. However, when actual call flow 221 is analyzed against the routing rules, flow 221 matches no permissible routing rules. When an improper call flow is detected by the STS, an improper call flow alarm is raised. The improper call flow will also be summarized by the STS so that deviations from a proper call flow can be highlighted. For instance, call flow 221 is improper because it is looping between CCE 211 and BE 213 and creating a call storm in the network. This deviation is highlighted to point out the inherent problem of call flow 221.

Figure 3:
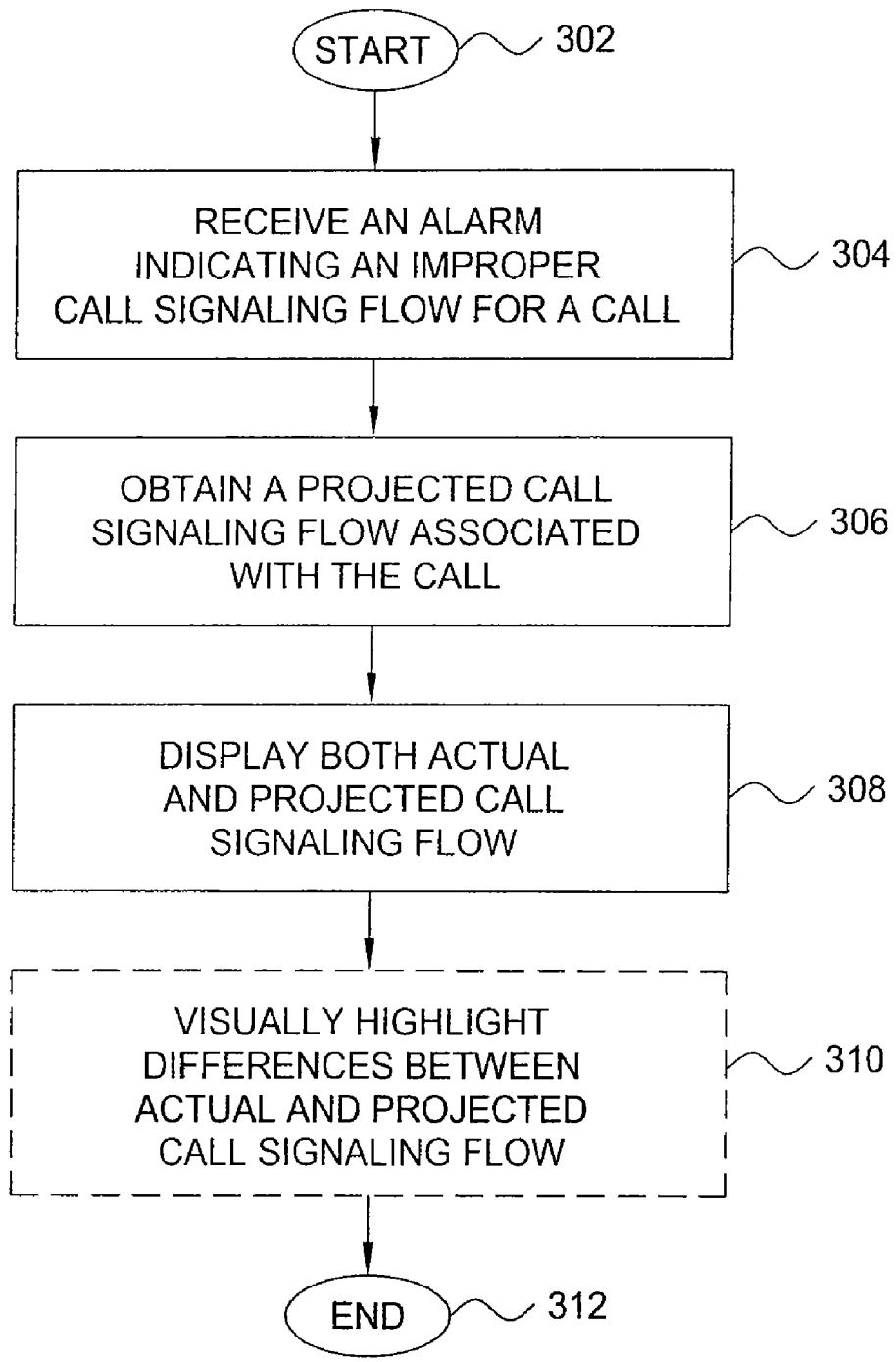
FIG. 3 illustrates a flowchart of a method for graphically displaying call flows of the present invention.

FIG. 3 illustrates a flowchart of a method for graphically displaying call signaling flows in a VoIP network. Method 300 starts in step 302 and proceeds to step 304.

At step 304, an alarm indicating an improper call signaling flow for a call is received. In one embodiment, an improper call flow alarm to warn a system management module (e.g., an AS) and/or the network operator of an improper call flow problem within the VoIP network is activated. This alarm may be an audible sound, visual indicator, electronic signal, and the like.

The method 300 continues to step 306 where a projected call signaling flow associated with the call is obtained. In one embodiment, this information can be obtained from a suite of prescribed call signaling flows permissible in the network by the network operator. Namely, by analyzing the service provider's network, a complete list of permissible call signaling flows can be deduced. In other words, by analyzing all possible signaling messages, e.g., call setup messages, call terminating messages, and so on, the method will be able to gather a listing of all possible call signaling flows within the communication network. Therefore, the projected call signaling flow may be readily derived from this listing. In one embodiment, the STS may access the calling signaling content of a possible improper call signaling flow for a given call in the event of an alarm. By utilizing the call signaling content and the listing described above, a projected call signaling flow for a call may be obtained. Notably, this projected call signaling flow represents the anticipated (i.e., proper) call signaling flow.

Figure 4:
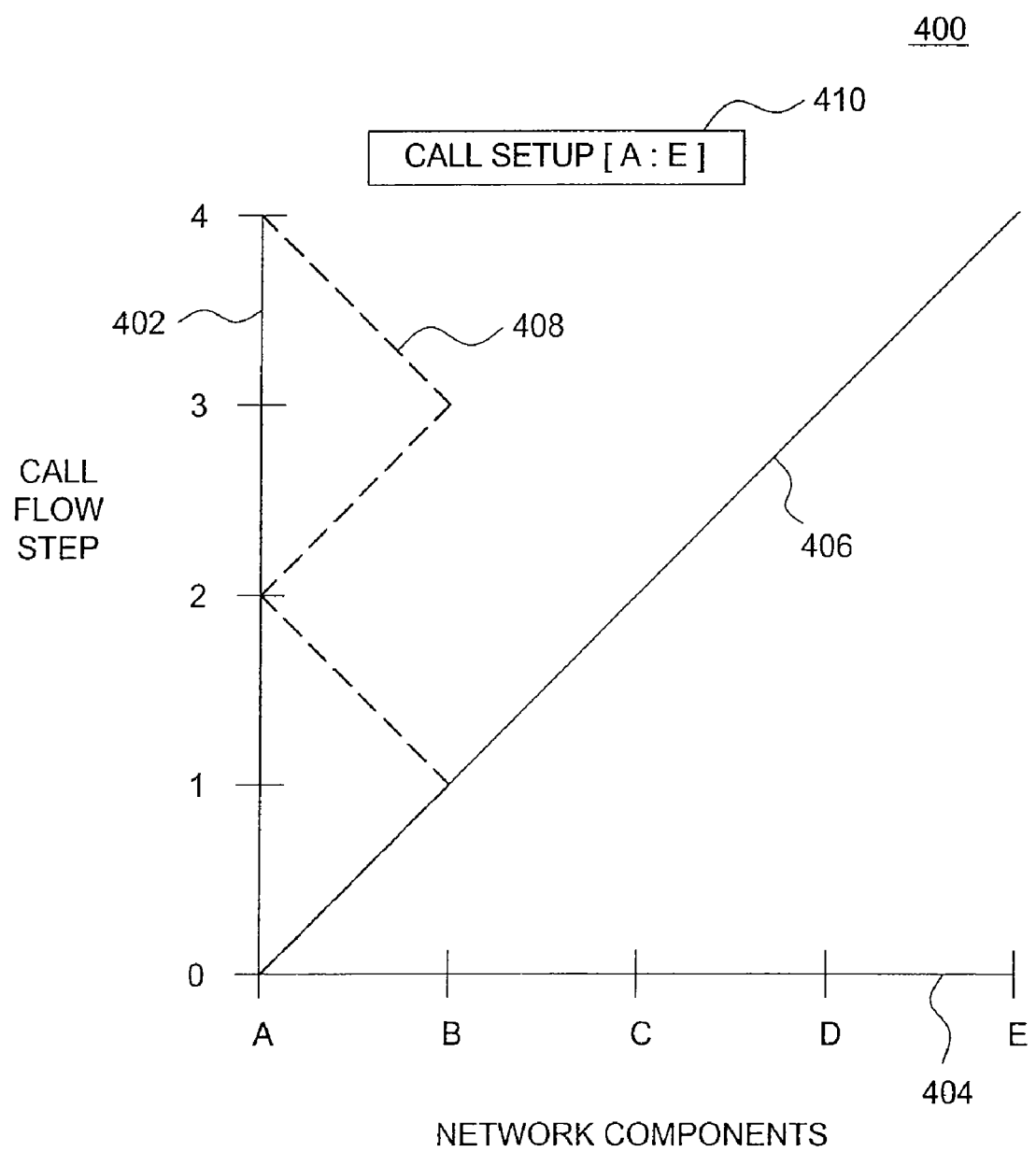
FIG. 4 illustrates an exemplary embodiment of a graphical display utilized in accordance with the present invention.

At step 308, the actual (i.e., potentially improper) call signaling flow and the projected call signaling flow are displayed. In one embodiment, information obtained from an STS is used to map the data pertaining to the actual call signaling flow to a graphical display. More specifically, the STS monitors the call signaling flows and collects trace elements. Similarly, data pertaining to the actual call signaling flow is also mapped to the same graphical display. In one embodiment, the content of the signaling messages is also visually displayed. The signaling message content may be displayed in a number of manners. In one embodiment, the origination point and end point of the project call are shown on the graphical display. In another embodiment, the graphical display is only activated when an alarm is executed. An example of one embodiment of this graphical display is shown in FIG. 4. In one embodiment, the method 300 continues to step 312 and ends.

In one embodiment, the method 300 may instead continue to step 310 where the differences between the actual call signaling flow and the projected call signaling flow are visually highlighted. In one embodiment, the contrast between the actual and projected call flows is highlighted with a flashing display. In another embodiment, the difference may be highlighted with a color-coding scheme. The method 300 continues to step 312 and ends.

FIG. 4 is an exemplary embodiment of a graphical display utilized in accordance with the present invention. In this embodiment, the graphical display 400 comprises of a vertical axis 402, a horizontal axis 404, and a call signaling content window 410, which may be shown on any type of visual display (e.g., computer screen, PDA, television screen, etc.). The vertical axis 402 represents the call flow steps (i.e., the number of steps a call signaling flow takes from its point of origin) and is numerically graduated. The horizontal axis represents various network components, which are represented by letters in this embodiment. For example, the letters A and E may represent the calling and receiving endpoint devices (e.g., 144, 145), respectively. Similarly, B and D may represent border elements 112, 113. Lastly, the letter C may represent the CCE.

In this embodiment, the solid line 406 would be the graphical representation of the projected call signaling flow (i.e., data representing the projected call signaling flow) described in FIG. 3. It would represent a "proper" call flow originating at endpoint device 144 (A) that proceeds to border element 112 (B) at call flow step 1. Border element 112 forwards the call signaling message to the CCE 111 (C) at call flow step 2, which in turn routes the call flow to border element 113 (D) at call flow step 3. Lastly, the call flow is forwarded to the receiving endpoint device 145 (E) at call flow step 4. In contrast, the dashed line 408 represents the actual (i.e., improper) call signaling flow (i.e., data representing the improper call signaling flow). In this example, there is a communication problem between the calling endpoint device 144 (A) and the border element 112 (B). The display 400 shows the calling signaling message "bouncing" between these two elements at call flow steps 1 through 4. Consequently, in one embodiment, the graphical display would highlight the portion of the improper call signaling flow that deviates from the projected call signaling flow. In this example, the portion of dashed line 408 starting at call step 1 (component B) and ending at call step 4 (component A) would be flashing, or alternatively, color-coded in a distinctive fashion. Lastly, the call signaling content window 410 would also be highlighted in some manner. In this example, the window 410 would indicate that the content of the call signaling message comprises a call setup message originating from endpoint device 144 (A), which in turn is requesting to communicate with endpoint device 145 (E).

Figure 5:
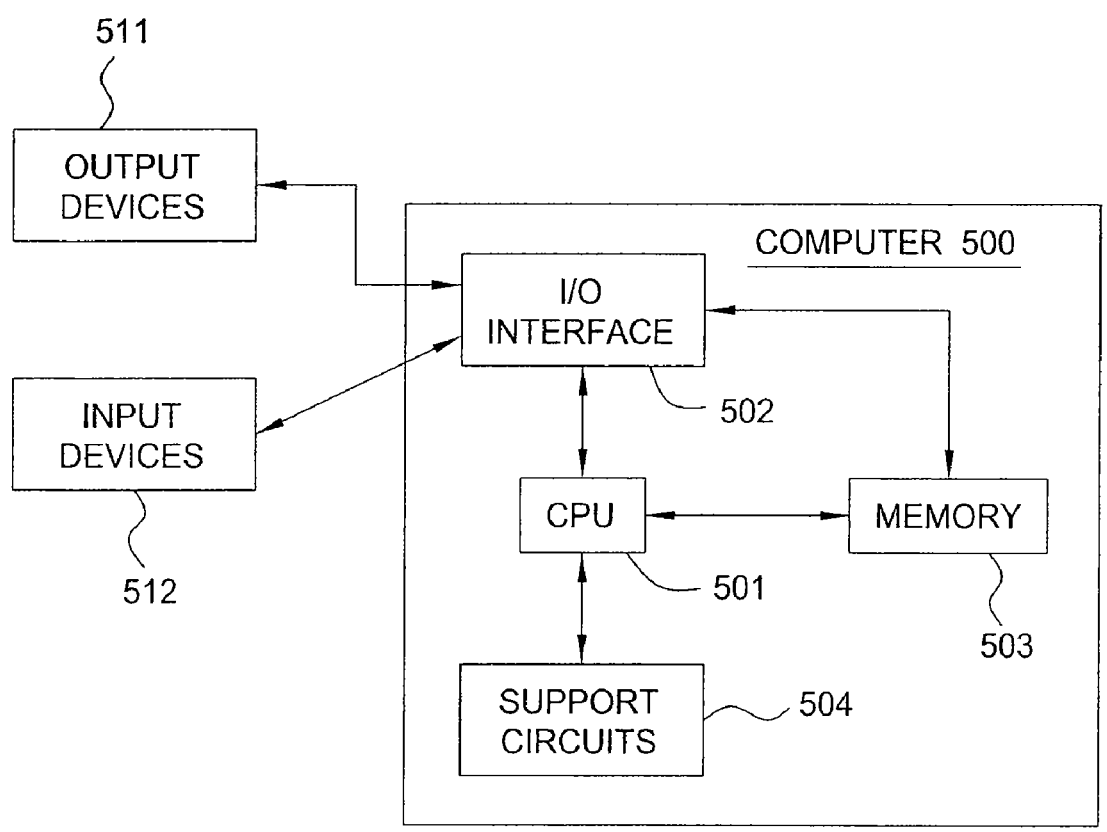
FIG. 5 illustrates a high level block diagram of a general purpose computer suitable for use in performing the functions described herein.

FIG. 5 is a block diagram depicting an exemplary embodiment of a computer 500 suitable for implementing the processes and methods described herein. For example, the computer 300 may be used to implement the call control element 111, border elements 112, 113, and the like of FIG. 1. The computer 500 includes a central processing unit (CPU) 301, a memory 503, various support circuits 504, and an I/O interface 502. The CPU 501 may be any type of microprocessor known in the art. The support circuits 504 for the CPU 501 include conventional cache, power supplies, clock circuits, data registers, I/O interfaces, and the like. The I/O interface 502 may be directly coupled to the memory 503 or coupled through the CPU 501. The I/O interface 502 may be coupled to various input devices 512 and output devices 511, such as a conventional keyboard, mouse, printer, display, and the like.

The memory 503 may store all or portions of one or more programs and/or data to implement the processes and methods described herein. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 500 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 503. The memory 503 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

What is claimed is:

1. A method for displaying call signaling flows in a communication network, comprising:
    receiving an alarm indicating an improper call signaling flow for a call;
    obtaining a projected call signaling flow associated with the call; and
    displaying the improper call signaling flow and the projected call signaling flow.

2. The method of claim 1, wherein data representing the improper call signaling flow is collected by a signaling tracer server that collects the improper call signaling flow from a plurality of network components in the communication network.

3. The method of claim 2, wherein the data representing the improper call signaling flow is graphically mapped to a visual display.

4. The method of claim 1, wherein the projected call signaling flow is derived from a plurality of permissible call signaling flows.

5. The method of claim 1, wherein data representing the projected call signaling flow is graphically mapped to a visual display.

6. The method of claim 1, further comprising:
    highlighting a difference between the improper call signaling flow and the projected call signaling flow on a visual display.

7. The method of claim 6, wherein the highlighting comprises:
    causing the difference to visually flash.

8. A non-transitory computer-readable medium having stored thereon a plurality of instructions, the plurality of instructions including instructions which, when executed by a processor, cause the processor to perform a method for displaying call signaling flows in a communication network, comprising:
    receiving an alarm indicating an improper call signaling flow for a call;
    obtaining a projected call signaling flow associated with the call; and
    displaying the improper call signaling flow and the projected call signaling flow.

9. The non-transitory computer-readable medium of claim 8, wherein data representing the improper call signaling flow is collected by a signaling tracer server that collects the improper call signaling flow from a plurality of network components in the communication network.

10. The non-transitory computer-readable medium of claim 9, wherein the data representing the improper call signaling flow is graphically mapped to a visual display.

11. The non-transitory computer-readable medium of claim 8, wherein the projected call signaling flow is derived from a plurality of permissible call signaling flows.

12. The non-transitory computer-readable medium of claim 8, wherein data representing the projected call signaling flow is graphically mapped to a visual display.

13. The non-transitory computer-readable medium of claim 8, further comprising:
    highlighting a difference between the improper call signaling flow and the projected call signaling flow on a visual display.

14. A system for displaying call signaling flows in a communication network, comprising:
    means for receiving an alarm indicating an improper call signaling flow for a call;
    means for obtaining a projected call signaling flow associated with the call; and
    means for displaying the improper call signaling flow and the projected call signaling flow.

15. The system of claim 14, wherein data representing the improper call signaling flow is collected by a signaling tracer server that collects the improper call signaling flow from a plurality of network components in the communication network.

16. The system of claim 15, wherein the data representing the improper call signaling flow is graphically mapped to a visual display.

17. The system of claim 14, wherein the projected call signaling flow is derived from a plurality of permissible call signaling flows.

18. The system of claim 14, wherein data representing the projected call signaling flow is graphically mapped to a visual display.

19. The system of claim 14, further comprising:
    means for highlighting a difference between the improper call signaling flow and the projected call signaling flow on a visual display.

20. The system of claim 19, wherein the means for highlighting comprises:
    means for causing the difference to visually flash.

* * * * *